Sept. 30, 1947. H. FIELD, JR 2,428,150
AUTOMATIC SHUT-OFF VALVE FOR HYDRAULIC TRANSMISSION SYSTEMS
Filed March 5, 1943

Inventor
HOWARD FIELD, JR.
By Frank Labraham
his Attorney

Patented Sept. 30, 1947

2,428,150

UNITED STATES PATENT OFFICE 2,428,150

AUTOMATIC SHUTOFF VALVE FOR HYDRAULIC TRANSMISSION SYSTEMS

Howard Field, Jr., Los Angeles, Calif.

Application March 5, 1943, Serial No. 478,138

5 Claims. (Cl. 60—52)

This invention relates to an automatic shut-off valve to be used in connection with hydraulic systems of the type which include a pump, a primary line extending from the pump to one or more devices to be operated hydraulically and a return line extending from the device or devices to the pump. This, briefly, is the type of hydraulic system used in aircraft and occasionally the hydraulic lines will break accidentally or will be broken or severed by gun fire or for other reasons. My automatic shut-off valve is included in the hydraulic system in such a manner that both the primary flow and the return flow pass through my valve. If any lines become broken or severed between my shut-off valve and any of the operating mechanisms (such as a hydraulic cylinder or control valve therefor), then my shut-off valve will automatically operate and will prevent the loss of fluid in the flow lines and permit the continued operation of all such devices connected thereto except the particular device with which the connecting lines are ruptured.

An object of my invention is to provide a novel automatic shut-off valve of the character stated which is controlled by the flow of fluid in the return line and if there is no flow of fluid in this return line, the valve remains closed and the pump cannot force fluid through such lines causing the fluid to be lost.

Another object of my invention is to provide a novel automatic shut-off valve in which the flow of fluid in the primary line actuates a piston, this piston closing the outlet port in the primary flow, the piston remaining in seated or closed position until flow is established in the return line.

Another object of my invention is to provide a novel automatic shut-off valve in which only a limited amount of fluid is permitted to flow in the primary line until flow is established in the return line.

Another object of my invention is to provide a novel automatic shut-off valve in which a poppet type of valve serves to prevent unlimited flow through the primary line until said valve is unseated by means of flow in the return line reacting against a piston, said poppet valve being adapted to open whenever flow in a reverse direction occurs in the primary line due to expansion of fluid or for other reasons.

A feature of my invention is to provide a novel means of unseating a valve in the primary flow line by pressure in the return flow line, thus opening the circuit in the primary flow line.

Another feature of my invention is to provide a valve of the character stated in which there is no accurate concentricity required in the valve and release mechanism therefore thereby eliminating accurate machine work and enabling the valve to be produced at a lower cost.

Still another object of my invention is to provide a novel automatic shut-off valve which is simple in construction, effective in operation and inexpensive to manufacture.

An advantage of my valve is that the flow can be established through my valve by a manual release in order to clear the lines or to test them.

Other objects, advantages and features of invention will appear from the accompanying drawing, the subjoined detailed description and the appended claims. Referring to the drawing, which is for illustrative purposes only.

Figure 1:
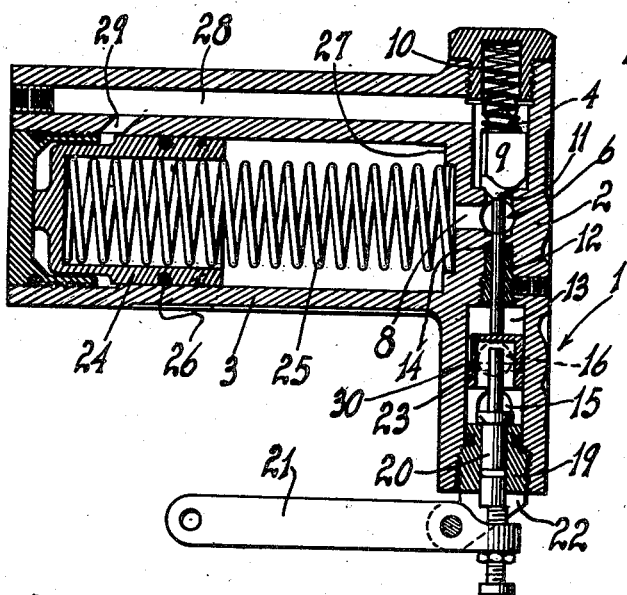
Fig. 1 is a vertical sectional view of my shut-off valve.

Referring more particularly to the drawing, my shut-off valve 1 comprises a valve body 2 and a cylinder 3 which may be an integral part of the body 2 or may be otherwise suitably attached thereto. The valve body 2 includes a primary inlet port 4 into which the primary flow line from the pump extends, shown diagrammatically at 5 in Fig. 3. A primary outlet port 6 is also provided in the body 2 and the primary line extending to the control valves or hydraulic operating mechanism extends from this port, this line is shown diagrammatically at 7 in Fig. 3. A duct 8 extends from the inner end of the cylinder 3 into the port 6. The purpose of this duct will be subsequently described.

A valve 9 is pressed downwardly by the coil spring 10 onto a seat in the bore 11 which also communicates with the outlet port 6. A push rod 12 adapted to contact the lower end of valve 9 extends downwardly into a bore 13 in the body 2. Suitable packing 14 surrounds the push rod 12 to prevent leakage around this push rod. A return flow intake port 15 extends through the body 2 and into the bore 13. An exhaust return port 16 also extends through the body 2 and into the bore 13 and is positioned above the port 15, substantially as shown. The return flow line 17 is diagrammatically shown in Fig. 3, and this flow line extends into the port 15. The exhaust return flow line 18, also diagrammatically shown in Fig. 3, extends to a reservoir or to the return of the pump, all of which is usual and well known in hydraulic systems. As thus far described it might be stated that if any of the lines 7, 17 or any of the other lines connecting the control valves or the hydraulic operating mechanism should be broken, either accidentally or by gun fire, then my control valve will automatically function to prevent the leakage of fluid through such a broken line.

A nut 19 closes the lower end of the bore 13 and pin 20 is slidably mounted in this nut. A hand lever 21 is pivotally mounted on an ear 22, depending from the nut 19. This hand lever engages the bottom of the pin 20 causing this pin to move upwardly and engage a piston 23 in the bore 13. The push rod 12 engages the upper face of the piston and consequently upward movement of the pin 20 will raise the piston 23 which will raise the push rod 12 which in turn will raise the valve 9 off of its seat, thus providing a passageway between the inlet port 4 and the outlet port 6 in the primary flow line and a passage between the intake port 15 and the exhaust port 16 in the return flow lines. A piston 24 is mounted in the cylinder 3 and is pressed towards the outer end of the cylinder by the coil spring 25.

The outer diameter of piston 24 carries a packing 26 which prevents fluid flowing through the clearance space necessarily existing between the piston and the cylinder due to manufacturing tolerances thus preventing fluid from flowing past the piston. A conduit 28 may be an integral part of the cylinder 3 or may be a separate tube if desired. This conduit 28 is open at one end to the primary intake port 4 and a port 29 connects the conduit 28 and the outer end of the cylinder 3 enabling fluid under pressure to act against the outer end of the piston 24 urging this piston inwardly.

Some fluid might leak past the piston 23 and be trapped in the portion of the bore 13 above the piston 23 and thus prevent upward movement of the piston. To overcome this difficulty I provide a relief channel 30 in the piston, this channel being open to the port 16 and permitting any accumulated fluid to pass out through this port.

In operating, assuming first that all of the lines are intact and that the valve is completely full of fluid, the pump forces fluid under pressure into the port 4. This fluid then passes through the conduit 28 and the duct 29 and urges the piston 24 inwardly, or towards the right, as viewed in Fig. 1. The inner end of the cylinder 3 is entirely filled with fluid and consequently this inward movement of the piston will cause the fluid contained in the cylinder and on the inward or right hand side of piston 24 to flow through the duct 8 and thence through the primary outlet port 6. This movement of fluid in the primary line causes the operating mechanism to function and there is an immediate movement of fluid in the return flow lines. This return fluid passes through the port 15 into the bore 13 lifting the piston 23, which lifts the push rod 12 which lifts the valve 9 against the spring 10. As soon as the valve 9 is unseated a passage is created between the ports 4 and 6 thus, providing free movement of fluid in the primary flow lines. The piston 23 is forced upwardly until the port 16 is exposed and a passage is thus provided for the return flow line within my control valve. If any of the lines between my control valve and the operating mechanism should be broken, there would be no fluid pressure available to lift the piston 23 and the valve 9. Consequently, the valve 9 would remain seated. The piston 24 would continue to advance in the cylinder 3 until it reached the stop 27. At this stage of operation no more fluid could be displaced through port 6 since valve 9 prevents direct flow between port 4 and port 6 and fluid cannot pass piston 24. The only fluid which would be lost would be the small amount which was in the cylinder 3 and which was forced out by the inward movement of the piston 24. Once the piston 24 is seated the pump can no longer force additional fluid into the system. As soon as the lines are repaired, however, the valve will automatically function as first described and the system will function in the intended manner.

If it is desired to clear the lines of air or obstructions or to test the lines the handle 21 may be operated to open clear passages through the valve in both the primary and return lines as described above. It is evident that the pin 20 does not have to be exactly concentric with the piston 23 nor the piston 23 exactly concentric with the push rod 12 nor the push rod 12 with the valve 9 in order for the automatic shut-off valve to function as intended. Consequently the machine work necessary to produce the valve can be easily and cheaply made.

Figure 3:
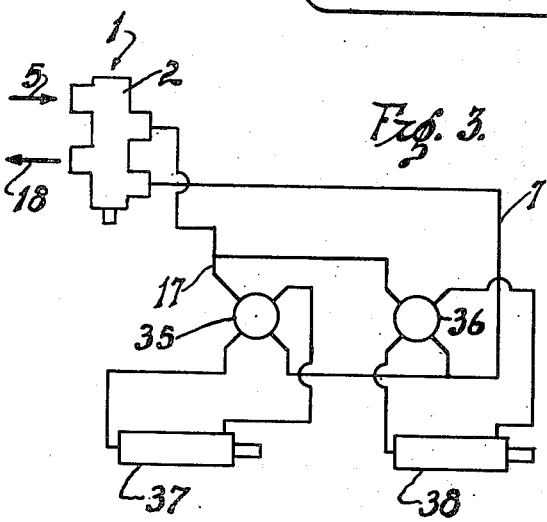
Fig. 3 is a diagrammatic view showing one method of connecting the shut-off valve in a hydraulic system.
Figure 2:
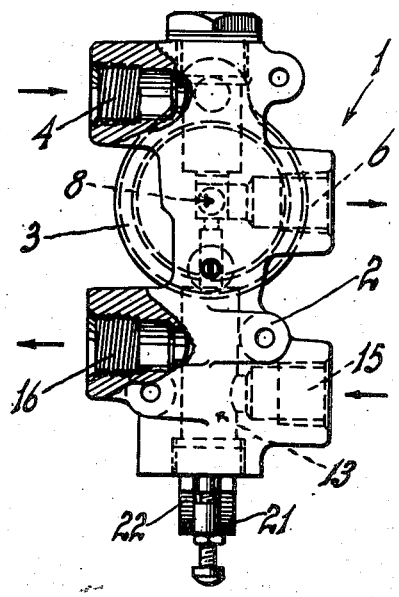
Fig. 2 is an end view of the same partly in section.

As shown in Fig. 3 I have shown a single automatic shut-off valve indicated at 2 with the control valves indicated at 35 and 36 connected respectively to operating cylinders 37 and 38. One cylinder being connected, for instance, to the flaps and the other to the landing gear of an airplane in the well known manner. These valves 35 and 36, of which there is one such valve for each part of the plane designed to be operated, are manually controlled. When for example the valve 35 is opened to the system and it is found that the lines connecting such valve to its operating cylinder have become ruptured the whole system fails in operation but if such valve 35 is then closed the remainder of the system becomes operative thereby allowing manipulation of other devices controlled by other operating values.

I claim as my invention:

1. An automatic shut-off valve comprising a valve body having a primary inlet port and a primary outlet port; a chamber communicating at one end with said primary inlet port and at the other end with said primary outlet port; a moveable fluid separating means within said chamber, said body having a return intake port and a return exhaust port, said valve body having a passage between said primary inlet port and said primary outlet port; a valve seat in said passage; poppet valve means engageable with said seat for controlling the flow to said primary outlet port; and means operable by the return fluid pressure to unseat said valve means.

2. An automatic shut-off valve comprising a valve body having a primary inlet port and a primary outlet port; a chamber communicating at one end with said primary inlet port and at the other end with said primary outlet port; a moveable fluid separating means within said chamber, said body having a return intake port and a return exhaust port; valve means controlling fluid flow between said primary inlet port and said primary outlet port, including a poppet valve and seat; and means operable by the return fluid pressure to unseat said valve means.

3. In an automatic fluid pressure valve, the combination of: housing means having first and second fluid chambers; first inlet and outlet ports communicating with said first chamber; second inlet and outlet ports communicating with said second chamber; first valve means in said first chamber movable between a closed position in which it closes fluid communication between said first ports and an open position in which it opens fluid communication between said first ports, said first valve means being at all times subjected to the fluid pressure in said first inlet port tending to retain it in said closed position; second valve means in said second chamber between said second ports and adapted to normally close fluid communication therebetween but movable in response to fluid pressure in said second inlet port to open fluid communication between said second ports; means operatively connecting said valve means so that movement of said second valve means is communicated to said first valve means to move said first valve means to said open position; a cylinder communicating at one end with said first inlet port and at the other end with said first outlet port; and piston means in said cylinder adapted to be moved in response to the admission of fluid under pressure into said cylinder from said first inlet port to displace fluid from said cylinder into said first outlet port.

4. An automatic shut-off valve comprising a valve body having a primary inlet port, a primary outlet port, a return intake port and a return exhaust port; a chamber communicating at one end with said primary inlet port and at the other end with said primary outlet port; movable means adapted to close communication between said chamber and said primary outlet port disposed within said chamber; valve means controlling flow between said primary inlet port and said primary outlet port; and means operable by the return fluid flow to open said valve means, said means comprising a piston normally closing the return exhaust port and movable by return flow entering the return intake port and a push rod engageable by said piston to open said valve means not later than the opening of said return exhaust port by said piston.

5. In an automatic fluid pressure valve, the combination of: a valve body having first and second fluid chambers, a first inlet port and a first outlet port communicating with said first chamber, a valve seat between said first ports, and a second inlet port and a second outlet port communicating with said second chamber, said body having a wall separating said chambers; a first valve member in said first chamber adapted to seat on said valve seat to close fluid communication between said first ports, fluid pressure in said first inlet port tending to hold said first valve member in seated position on said valve seat; a second valve member in said second chamber between said second ports and adapted to normally close communication therebetween but movable in response to fluid pressure in said second inlet port to open fluid communication between said second ports, said second valve member having an effective cross-sectional area exposed to fluid pressure in said second inlet port greater than the effective cross-sectional area of said first valve member exposed to fluid pressure in said first inlet port; a valve stem extending through said wall and adapted to operatively connect said valve members so that said first valve member is unseated in response to movement of said second valve member; a cylinder communicating at one end with said first inlet port and at the other end with said first outlet port; and piston means in said cylinder adapted to be moved in response to the admission of fluid under pressure into said cylinder from said first inlet port to displace fluid from said cylinder into said first outlet port.

HOWARD FIELD, JR.

REFERENCES CITED

The following references are of record in the file of this patent:

UNITED STATES PATENTS

| Number | Name | Date |
| --- | --- | --- |
| 881,848 | Day | Mar. 10, 1908 |
| 1,045,693 | Gillman | Nov. 26, 1912 |
| 1,775,856 | Hauser | Sept. 16, 1930 |
| 2,263,470 | Perkins | Nov. 18, 1941 |
| 2,286,880 | Traut | June 16, 1942 |
| 2,333,100 | Grant | Nov. 2, 1943 |